Patented Apr. 3, 1945

2,372,756

UNITED STATES PATENT OFFICE 2,372,756

WATER-IN-OIL EMULSIONS

Laszlo Auer, South Orange, and Arthur Francis Ray, Hawthorne, N. J., assignors to Ridbo Laboratories, Inc., Paterson, N. J., a corporation of New Jersey No Drawing. Application December 16, 1942, Serial No. 469,210

14 Claims. (Cl. 106—170)

GENERAL FIELD OF INVENTION AND STATEMENT OF OBJECTS

This invention relates to fatty oil dispersions or emulsions and to a method of preparing such dispersions. The invention, moreover, is concerned with emulsions or dispersions of the water-in-oil type, and especially where the emulsions contain a drying or a semi-drying fatty oil.

Aqueous dispersions in general constitute an advantageous form in which to market various coating compositions, such as paints and the like, because of economies effected in manufacture and also for other reasons including the fact that such dispersions have reduced inflammability as compared with paints containing only organic solvents, such as mineral spirits.

Coating composition emulsions of the oil-in-water type are effective for many purposes, particularly where porous surfaces are to be coated. On the other hand, coating composition emulsions of the water-in-oil type not only are capable of use in coating porous surfaces but also are well-adapted to the coating of non-porous surfaces, such as glass and metal.

Still further, a dispersion or emulsion of the water-in-oil type has another important advantage as compared with a dispersion of the oil-in-water type since the former does not freeze to a solid mass on drop of temperature, the water being present in the discontinuous or dispersed phase. Therefore, coating compositions comprising emulsions of the water-in-oil type may conveniently be shipped at freezing temperatures, in unheated freight cars.

According to this invention, in preparing emulsions of the water-in-oil type, exceptionally satisfactory results are secured both from the standpoint of forming the emulsion and also from the standpoint of the properties of the emulsion products, where the emulsion is prepared in a manner to incorporate methyl cellulose. In fact, methyl cellulose serves to greatly facilitate dispersion of the water in the oil phase when making a water-in-oil dispersion, the methyl cellulose apparently functioning as an emulsifying agent. Moreover, the emulsion products produced have highly desirable properties from various standpoints including consistency of the emulsion with a given water content, and stability.

Heretofore it has been customary when preparing water-in-oil emulsions to employ emulsifying and/or stabilizing agents which are soluble in the oil phase. Methyl cellulose being substantially insoluble in oil, its action in promoting the formation of the emulsion and in stabilizing the emulsion is quite surprising and unexpected.

Because of the foregoing and other desirable properties of the emulsion products, the products are particularly well adapted for use in certain coating or impregnating compositions, for instance, where reduced penetration is desired, such as in printing inks for textiles and paper, and where non-porous surfaces have to be wetted out, as in coating glass and metal surfaces.

The invention is not only applicable to fatty oils in their natural state (such as various examples given hereinafter) but also to various treated fatty oils having increased viscosity, such as heat bodied fatty oils and, oils which have been vulcanized, at least to a considerable degree. Although it may not always be practicable to form emulsions according to the invention with extensively vulcanized fatty oils, still the invention is well adapted to emulsification even of very heavy or semi-solid fatty oil products. In general, for most purposes it is contemplated that where vulcanized oils are employed, the degree of vulcanization should not be farther advanced than that stage of vulcanization which is herein termed "partial" vulcanization, in contrast to "full" vulcanization. In further explanation of this degree of vulcanization, note the following:

During vulcanization of fatty oils, sulphur is ordinarily mixed with the oil and the mixture heated to an elevated temperature, for instance, from about 120° C. to about 200° C. During the first portion of the time of vulcanization, the oil is still liquid, and may remain so even after some considerable reaction of the sulphur with the oil. In these early stages of vulcanization, if the heating be terminated, the products are liquid at room temperature or are reversibly fusible and thermoplastic. Furthermore, the entire mass of the mixture may be soluble in certain organic solvents. Products of this degree of vulcanization are herein considered as "partially" or semi-vulcanized products.

If the vulcanization be carried further, by continued heating at the vulcanization temperature, a solid mass is formed, which mass is infusible (except upon decomposition) and the mass as a whole is insoluble in organic solvents. Products having this degree of vulcanization are herein considered as "fully" or completely vulcanized products, notwithstanding the fact that in some cases further solidification might be effected by continued heating beyond the time at which the infusible mass is initially formed.

With respect to the use of terms herein, further attention is directed to the following:

Although the term "emulsion" is sometimes applied only to that class of colloidal dispersions wherein the oil phase is liquid, in technical literature the term "emulsion" is quite commonly applied to that type of dispersion in which the oil phase is at least semi-solid or pasty, so long as the dispersion displays the general nature and behavior of liquid-liquid emulsions. It is to be understood that herein the term emulsion is not employed in the narrow sense, but is used to apply to dispersions even where the oil phase constitutes or incorporates a more or less solid material.

Various of the distinctive and advantageous properties of the dispersions of the present invention are considered more fully hereinafter, but it is here further mentioned that employment of dispersions containing methyl cellulose is of advantage for many uses because of the fact that methyl cellulose is only very difficultly soluble in cold water and insoluble in boiling water. Therefore, when used, for instance, in varnishes, impregnating compositions or in other materials where weather resistance is of importance, films may be deposited, which films have a high degree of water resistance. Still other advantageous properties of the emulsions are mentioned hereinafter.

THE FATTY OIL

The invention is applicable to the preparation of emulsion products of the water-in-oil type from fatty oils generally, a typical list of such oils being as follows:

Tung oil
Oiticica oil
Dehydrated castor oil
Linseed oil
Perilla oil
Sunflower oil
Poppyseed oil
Soya bean oil
Walnut oil
Rapeseed oil
Pine seed oil
Olive oil
Corn oil
Cottonseed oil
Coconut oil
Babassu oil
Hydroxylated oils such as castor oil, etc.
Fish oils (train oils)

In addition, it should be noted that esters of fatty acids other than the natural glycerin esters (fatty oils) may be used, for example, synthetic glycerin esters of fatty acids, and fatty acid esters formed with other polyhydric alcohols, such as glycols, pentaerythritol, mannitol, sorbitol, etc.

Alkyd resins of the types containing fatty acids and polyhydric alcohols may also be dispersed according to the present invention.

According to the invention, emulsions of the water-in-oil type may be prepared with still other combinations of materials. Thus, in addition, to emulsions of the fatty oils themselves, the invention contemplates emulsification of mixtures of fatty oils with resins such as rosin or other resins used in making oleo-resinous varnishes. Other useful composite materials are fatty oils with solvents; and fatty oils mixed both with resins and with solvents.

Many of the varnishes or varnish bases comprise mixtures of materials of the types mentioned just above and, in general, the invention contemplates the use of varnish bases, thereby yielding new and useful dispersion products of particular utility in the field of coating or impregnating compositions. Herein the term varnish base is used to refer to the varnish solids, usually fatty oils or fatty oil and resin mixtures, and sometimes also suitable resins alone.

Various of the oils and other materials mentioned above may be emulsified in partially vulcanized condition, under some circumstances.

The fatty oils employed, either alone or in admixture with other materials, may or may not be bodied or otherwise treated, prior to emulsification.

In fact, bodied oils, such as heat bodied fatty oils, constitute a particularly valuable group of materials for producing emulsions according to the present invention. Such heat bodying may be effected in any one of quite a wide variety of ways, as follows: For instance, mere heating of the fatty oil at heat bodying temperatures may in some cases be sufficient to raise the viscosity to a sufficient degree. In many cases heating in the presence of modifying agents promoting heat bodying is frequently an advantageous way of securing the heat bodied oil, many examples of such heat bodying in the presence of modifying agents being disclosed in patents, Nos. 1,963,065, 2,189,772, 2,213,944, 2,293,038, 2,298,270 and 2,298,916.

Air or oxygen blowing, either with or without increase in temperature may be employed for bodying. Blowing of other gases through the oil either at low or at elevated temperatures may also serve the purpose.

There are still other ways in which bodying may be achieved, for instance, by subjecting the oil to the action of ultra violet light, producing so-called "Uviol" oils. Furtherfore, subjecting the oil to electrical potential differences, or to electric fields are expedients known to secure bodying, an example of such an oil being known as "Voltol" oil.

Since, for the present purposes, the materials of the oil phase should not be completely solid, where such materials are too stiff at room temperature, in many cases their fluidity may be increased sufficiently for dispersion by heating.

EMULSIFICATION PROCEDURE

In considering emulsification procedure, it is first noted that dispersion may be effected with any of certain known types of equipment, and also in accordance with several general modes or methods of dispersion, the important consideration from the standpoint of this invention being the preparation of a water-in-oil emulsion in the presence of and containing methyl cellulose.

As to equipment and methods in general, with many materials, especially those which are of quite low viscosity at room temperature, mere mixing and agitation of the materials may suffice.

Mixing of the materials on a roller mill of the types employed in grinding pigments into paints may also be adopted, this practice being advantageous for certain materials, especially where the materials are of relatively high viscosity or are more or less solid at normal room temperature.

When a three roller paint mill is employed for dispersion, it will be found advantageous to set the first two rollers quite close together, the third or take-off roller being separated from the middle roller. The material to be dispersed is placed on the first two rollers and worked until uniform. During this initial working, it is frequently of advantage to maintain a temperature differential between the first and second rollers, (customarily accomplished by circulating a cooling liquid through the second roller), the result of which is that the material remains primarily on the second or middle roller, with little or none on the first roller. The liquids or solutions added at the time of dispersion are preferably added slowly or in increments, and after all additions are made, the take-off roller may be adjusted so as to pick the material up from the middle roller, the material finally being removed from the take-off roller by the usual doctor blade, and collected in any suitable receptacle.

Again mixture and dispersion may be effected by placing the materials in a kneading machine of the Werner and Pfleiderer type. Other machines of this general type are the so-called Banbury and Baker-Perkins mixers.

In employing any of the foregoing means of securing dispersion and emulsification, at least some heat may be advantageously applied. In cases where simple agitation may be sufficient, the vessel may be heated in any suitable manner. Employment of a Werner and Pfleiderer mixer may also be advantageous when it is desired to employ heat, since a mixer of this type is equipped to be heated by an external jacket or through the kneading blades.

Whatever mixing equipment and procedure is adopted, it is desirable to add the methyl cellulose at the time of dispersion, the methyl cellulose advantageously being added in the form of an aqueous solution, in increments or stages, or in any other appropriate manner providing for slow addition.

Other conventional equipment may also be used such as homogenizers, and various types of colloid mills.

Not all types of equipment are necessarily useable with all the dispersions which can be made according to this invention, so that selection may be required according to the particular problem.

METHYL CELLULOSE

Methyl cellulose is a cellulose ether which is difficultly soluble in cold water, and insoluble in boiling water. It is commercially available in various viscosity ranges. Preferably, according to the present invention, it is used in a form having relatively low viscosity, since aqueous solutions of the low viscosity methyl cellulose are easier to prepare than the solutions of high viscosity methyl cellulose. A suitable range of methyl cellulose viscosity extends from about 15 centipoises to about 25 centipoises (cps.) in 2% aqueous solution. However, for specific purposes it may be advantageous to use methyl cellulose having a higher viscosity than 25 centipoises.

Methyl cellulose is a highly desirable ingredient in fatty oil dispersions. In addition to the advantages of ease of dispersion and emulsion stability, which advantages are attributable at least in part to the employment of methyl cellulose, the presence of methyl cellulose does not detrimentally influence other properties of the emulsion or of the coating films or other materials made therefrom. In fact, various advantageous properties of, for instance, coating films made from the emulsions, are even enhanced by the presence of methyl cellulose.

To illustrate the above, the very fact that methyl cellulose is only difficultly soluble in cold water and insoluble in hot water, is of distinct advantage, for instance, in coating compositions, impregnating compositions or in other materials wherein water and weather resistance are of importance, as explained above.

In addition to the advantages enumerated above, the employment of methyl cellulose as an emulsifying agent when preparing coating composition emulsions, particularly where the methyl cellulose is the sole emulsifying agent employed, is further of advantage for the following reasons.

Methyl cellulose is neutral and, therefore, when incorporated in an emulsion makes possible ready mixing of the emulsion with other emulsions and even with water-free paints or coating compositions containing only organic solvents, in addition to the vehicle solids. In contrast, heretofore, emulsifying and stabilizing agents employed have frequently been either anionic or cationic in action, in which event mixing of two such prior emulsion paints, one containing an anionic emulsifying agent and another a cationic emulsifying agent would sometimes precipitate (demulsify) each other.

The neutral character of methyl cellulose, therefore, has special advantages from the standpoint of permitting mixtures of various paint emulsions, even where different components of such mixtures are produced by different manufacturers. In fact, the methyl cellulose containing emulsions of this invention may often be mixed with other paint emulsions containing anionic or cationic emulsifying agents, without demulsifying either.

Dispersions according to the present invention, containing methyl cellulose may readily be mixed with other water-in-oil type emulsions and are often very miscible with oil-in-water-type emulsions, particularly if both emulsions are of relatively high viscosity, i. e., are not yet very extensively diluted.

The methyl cellulose may be dispersed in the materials being emulsified in different ways, depending somewhat on the nature of the materials being emulsified. However, in general, we prefer to introduce the methyl cellulose in the form of an aqueous solution, small portions of which are successively added, the latter procedure being of especial importance when making emulsions with relatively viscous materials, such as heat bodied or partially vulcanized fatty oils.

The concentration of the methyl cellulose in the solution employed for introducing it into the mixture may vary over a considerable percentage range, although we have found effective results are secured with a solution in which the methyl cellulose constitutes from about 1% to about 5%. Highly effective results have been obtained by the employment of a solution of about 2% concentration.

The total quantity of methyl cellulose need not be more than a very small percentage, even down to about 0.1% (based on the solid content of the dispersion) being effective in many cases. Naturally, the methyl cellulose need only be used in that quantity required to serve its intended functions, any excess usually being uneconomical from the standpoint of use of materials. From a very small fraction of 1%, for instance, from about 0.01% or 0.05% up to about 2% (based on the solid content) is sufficient for most purposes.

With regard to the quantity of methyl cellulose present, it is noted that in general, the percentage (based on the content of dispersion medium) should be increased in accordance with the quantity of water present.

Another consideration which should be kept in mind is that the emulsion should not contain appreciable quantities of wetting agents, such as sulphonated fatty alcohols or soaps, or of other similar materials tending to reduce the surface tension at the oil-water interface, since the excessive presence of such wetting agents tends to produce a dispersion of the oil-in-water type. Traces or small quantities of wetting agents may be present, in addition to methyl cellulose, so long as the quantity used is insufficient to invert the phases of the emulsion.

EXAMPLES

*Example 1*

In this example a water-in-oil emulsion was prepared with an ester gum varnish base of 25 gallon length. This varnish base was initially prepared as indicated below:

| | Parts by weight |
|---|---|
| "SO$_2$ oil" | 667 |
| Ester gum | 333 |
| Sulphur | 10 |

The "SO$_2$ oil" comprised raw linseed oil preliminarily treated as follows:

A batch of 8,000 grams of raw linseed oil was heated under vacuum at a pressure of 100 mm. Hg in a 22 liter flask and during rise in temperature to 300° C. SO$_2$ was bubbled through the oil at a rate of 20 grams per hour. The oil was kept for five hours at 300° C., during all of which time the bubbling of SO$_2$ was continued, and then the heating was stopped and the mass was allowed to cool to 200° C., SO$_2$ still being bubbled therethrough during drop in temperature. When 200° C. was reached, the mass was permitted to cool to room temperature. The oil prepared in this manner is hereinafter referred to as "SO$_2$ oil."

The varnish base was prepared by heating the ester gum and oil together to 160° C. and then adding the sulphur and holding the temperature at 160° C. for ten minutes.

Driers were added to the varnish base, 1.23 cc. of a drier solution being added to each 100 grams of the varnish base. The drier solution was as follows:

A mixture of naphthenate driers in mineral spirits containing in each 1.23 cc.:

| | Grams |
|---|---|
| Cobalt (metal) | 0.03 |
| Lead (metal) | 0.3 |
| Manganese (metal) | 0.02 |

Using the foregoing varnish base, an emulsion was prepared from the batch of 100 grams of said varnish base, containing 1.23 cc. of the drier solution, and these materials were worked on a paint mill at room temperature. 51 grams of a 2% aqueous methyl cellulose solution was then added, together with 10 grams of water. The resultant emulsion diluted readily with mineral spirits and was stable.

*Example 2*

100 grams of the varnish base employed in Example 1 was worked on a paint mill at room temperature, the varnish base containing .67 cc. of the drier solution. 101 grams of a 1% aqueous methyl cellulose solution were added. The resultant emulsion was rather viscous but diluted readily with mineral spirits and was stable.

*Example 3*

The material employed in this example was the same ester gum varnish base employed in Example 1, but cut with mineral spirits to give a varnish of 50% solids. 100 grams of this cut varnish was then worked on a paint mill at room temperature, the base containing .33 cc. of the drier solution. 101 grams of a 1% aqueous methyl cellulose solution was added. The emulsion was viscous but diluted readily with mineral spirits and was stable.

*Example 4*

The same ester gum varnish cut with mineral spirits to 50% solids, as in Example 3, was also employed in Example 4. 100 grams of said cut varnish was worked on a paint mill at room temperature, the material containing .33 cc. of the drier solution. 52 grams of a 2% aqueous methyl cellulose solution were added, along with 10 grams of water. The emulsion diluted readily with mineral spirits. It was less viscous than the emulsion produced in accordance with Example 3.

*Example 5*

A maleic type varnish base of 25 gallon length was employed in this example. This varnish base was prepared with the same SO$_2$ oil referred to under Example 1 above, in accordance with the following formulation:

| | Parts by weight |
|---|---|
| SO$_2$ oil | 667 |
| Amberol 801 (a rosin modified maleic resin) | 333 |
| Sulphur | 10 |

To promote compatibility, the resin, together with 200 parts of the oil were heated to 300° C., and then the rest of the oil was added slowly, the temperature being held at 300° C. until the mixture was clear. The temperature was then dropped to 160° C. and sulphur was added, the temperature being held for five minutes at 160° C. after addition of the sulphur.

100 grams of the foregoing maleic varnish base containing 1.23 cc. of the drier solution above mentioned, was worked on a paint mill at room temperature and 51 grams of a 2% aqueous methyl cellulose solution were added along with 10 grams of water. The emulsion diluted readily with mineral spirits and was stable.

*Example 6*

A maleic type varnish base similar to that employed in Example 5, but of twelve and a half gallon length, was employed in Example 6. This was prepared in accordance with the following formulation:

| | Parts by weight |
|---|---|
| SO$_2$ oil | 500 |
| Amberol 801 (a rosin modified maleic resin) | 500 |
| Sulphur | 7½ |

The resin, plus 200 parts of the oil, were heated to 300° C. and the remainder of the oil then added slowly, the temperature being held at 300° C. until the mixture was clear. The temperature was then permitted to drop to 160° C. and the sulphur was added, the temperature being held at 160° C. for five minutes after the addition of the sulphur.

The foregoing was then diluted with mineral spirits to 50% solids and 100 grams of the resulting solution containing .46 cc. of the drier solution above mentioned, was mixed under agitation at room temperature with 51 grams of a 2% aqueous methyl cellulose solution and 10 grams of water. The emulsion so formed diluted readily with mineral spirits and was stable.

*Example 7*

2000 grams of "SO₂ oil" was heated in a stainless steel container to a temperature of 118° C., with slow agitation. 30 grams of sulphur was added to the oil at that temperature, the sulphur being added gradually, while continuing the agitation. After the sulphur was all incorporated and dissolved in the oil the temperature was raised to 138° C. At this point the heating was discontinued and the mass allowed to cool to 120° C. At that temperature 6.88 cc. of 6% manganese naphthenate solution was added, together with 10.33 cc. of a 6% cobalt naphthenate solution, and 21.2 cc. of a 24% lead naphthenate solution. The percentages are metal content in the solution. Agitation was continued for another 15 minutes during a further cooling period. At this point the agitation was discontinued and the product cooled to room temperature.

100 grams of the above product was put on a 3-roller mill (laboratory size). 102 grams of a 1% aqueous methyl cellulose solution was added slowly and gradually to the oil phase. After the emulsion was prepared, it was homogenized by passing it through a laboratory size colloid mill. The resulting emulsion is of the water-in-oil type and dilutes readily with mineral spirits. Trial strike-off films have shown that it forms satisfactory coatings both on glass and on wood.

*Example 8*

1000 grams of "SO₂ oil," viscosity Z5 to Z6 on the Gardner scale, plus 500 grams of ester gum were cooked for 4 hours at approximately 280° C. To 800 grams of this varnish base 5.33 cc. of a drier mixture of lead-manganese-cobalt was added, having the strength described in Example 1 above.

100 grams of this mixture was put on a 3-roller laboratory size paint mill and 101 cc. of a 1% aqueous methyl cellulose solution was added slowly and gradually to the varnish base. A water in oil type emulsion resulted, which was readily dilutable with mineral spirits.

*Example 9*

To the remaining 700 grams of the varnish base prepared in Example 8, 700 grams of mineral spirits were added together with 4.67 cc. of a drier mixture the composition of which is described in Example 1 further above. To 100 grams of the resulting varnish solution 101 grams of a 1% aqueous methyl cellulose solution was added on a paint mill gradually and slowly, producing a water in oil emulsion which had a very high viscosity.

*Example 10*

100 grams of "SO₂ oil" having a viscosity of Z5 to Z6 in the Gardner scale, was put on a 3-roller laboratory size paint mill. 52 cc. of a 2% methyl cellulose solution was added gradually and slowly. After the incorporation of the methyl cellulose solution 10 cc. of water were added to the mixture on the paint mill. The resulting emulsion was a water in oil type emulsion having a high viscosity.

We claim:

1. An emulsion product, the dispersed phase of which comprises water and the dispersion medium of which incorporates a soap-free fatty oil, the emulsion containing methyl cellulose in effective minor amounts ranging upwards of 0.01% in relation to the dispersion medium.

2. An emulsion product in accordance with claim 1 in which the fatty oil has at least semi-drying properties.

3. An emulsion product in accordance with claim 1 in which the fatty oil is a partially vulcanized fatty oil.

4. An emulsion product in accordance with claim 1 in which the fatty oil is a bodied fatty oil.

5. An emulsion product in accordance with claim 1 in which the dispersion medium also contains an organic solvent for the fatty oil.

6. An emulsion product in accordance with claim 1 in which the methyl cellulose is present in an amount from about 0.01% to about 2% of the dispersion medium.

7. An emulsion product in accordance with claim 1 in which the methyl cellulose is present in an amount about 1% of the dispersion medium.

8. An emulsion product, the dispersed phase of which comprises water and the dispersion medium of which incorporates a fatty oil, the emulsion containing methyl cellulose in effective amounts ranging upwards of 0.01% in relation to the dispersion medium, and said emulsion further being substantially free of anionic and cationic emulsifying and wetting agents.

9. A coating composition comprising an emulsion of the water-in-oil type, the dispersed phase of the emulsion comprising water and the dispersion medium incorporating a resin and a soap-free fatty oil having at least semi-drying properties, the emulsion containing methyl cellulose in effective minor amounts ranging from a fraction of 1% to in the neighborhood of about 2% in relation to the dispersion medium.

10. A coating composition in accordance with claim 9 in which the fatty oil is a partially vulcanized fatty oil.

11. A coating composition in accordance with claim 9 in which the dispersion medium further incorporates an organic solvent for the fatty oil and the resin.

12. A coating composition in accordance with claim 9 in which the methyl cellulose is present in an amount from about 0.01% to about 2% of the dispersion medium.

13. A coating composition in accordance with claim 9 in which the methyl cellulose is present in an amount about 1% of the dispersion medium.

14. A coating composition comprising an emulsion of the water-in-oil type, the dispersed phase of the emulsion comprising water and the dispersion medium incorporating a fatty oil having at least semi-drying properties, the emulsion containing methyl cellulose in a minor amount and not materially above about 2% in relation to the dispersion medium, and said emulsion further being substantially free of anionic and cationic emulsifying and wetting agents.

LASZLO AUER.
ARTHUR FRANCIS RAY.